(12) United States Patent
Sirichai et al.

(10) Patent No.: US 7,673,745 B2
(45) Date of Patent: Mar. 9, 2010

(54) CASE FOR PORTABLE ELECTRONIC DEVICE

(75) Inventors: Saharut Sirichai, Los Angeles, CA (US); Ernesto Quinteros, Los Angeles, CA (US)

(73) Assignee: Belkin International, Inc., Compton, CA (US)

( * ) Notice: Subject to any disclaimer, the term of this patent is extended or adjusted under 35 U.S.C. 154(b) by 104 days.

(21) Appl. No.: 11/391,796

(22) Filed: Mar. 28, 2006

(65) Prior Publication Data
US 2007/0235492 A1 Oct. 11, 2007

(51) Int. Cl.
B65D 5/52 (2006.01)

(52) U.S. Cl. .................... 206/45.23; 206/320

(58) Field of Classification Search .......... 206/320, 206/775, 736, 205, 216, 307, 701, 720, 721, 206/338, 348, 461, 477, 37, 495, 521, 524.1, 206/525, 425, 45.23; 224/270; 150/132
See application file for complete search history.

(56) References Cited

U.S. PATENT DOCUMENTS

| | | | | |
|---|---|---|---|---|
| 982,292 | A * | 1/1911 | Naramore | 206/237 |
| 1,613,536 | A | 1/1927 | Rose | |
| 3,741,376 | A * | 6/1973 | Brown et al. | 206/5 |
| 4,259,568 | A * | 3/1981 | Dynesen | 235/1 D |
| 5,295,089 | A | 3/1994 | Ambasz | |
| 5,423,363 | A * | 6/1995 | Matzdorff et al. | 150/143 |
| 5,706,992 | A * | 1/1998 | Moor | 224/657 |
| 5,724,225 | A * | 3/1998 | Hrusoff et al. | 361/683 |
| 5,887,777 | A * | 3/1999 | Myles et al. | 224/578 |
| 5,938,096 | A * | 8/1999 | Sauer et al. | 224/625 |
| 5,971,242 | A * | 10/1999 | Schuerman | 224/544 |
| 6,003,831 | A * | 12/1999 | Coleman | 248/688 |
| 6,145,661 | A * | 11/2000 | Jung | 206/320 |
| 6,354,477 | B1 * | 3/2002 | Trummer | 224/575 |
| 6,772,879 | B1 | 8/2004 | Domotor | |
| 7,270,255 | B2 * | 9/2007 | Badillo et al. | 224/577 |
| 2003/0219115 | A1 | 11/2003 | Kohli et al. | |
| 2003/0223184 | A1 * | 12/2003 | Nakamura | 361/679 |
| 2005/0098594 | A1 | 5/2005 | Truong | |
| 2005/0247584 | A1 * | 11/2005 | Lu | 206/320 |

OTHER PUBLICATIONS

Internet website for kate spade broome street Leather Case for iPod.

* cited by examiner

*Primary Examiner*—Mickey Yu
*Assistant Examiner*—Jenine M Pagan
(74) *Attorney, Agent, or Firm*—Bryan Cave LLP

(57) ABSTRACT

Cases for portable electronic devices, including cases that provide support as well as protection. Cases may be configured to contain a video-capable electronic device (601) and may both protect the device and allow it to maintain a hands-free viewing position. Embodiments include a first panel (110) having an upper portion (111) and a lower portion (112) separated from each other by a hinge line (113), a second panel (120) spaced apart from and coupled to the upper portion of the first panel by a first sidewall (160) and a second sidewall (170), and a third panel (130) spaced apart from and coupled to the lower portion of the first panel by a third sidewall (180) and a fourth sidewall (190). The first panel is capable of being folded along the hinge line into a flexed position.

27 Claims, 6 Drawing Sheets

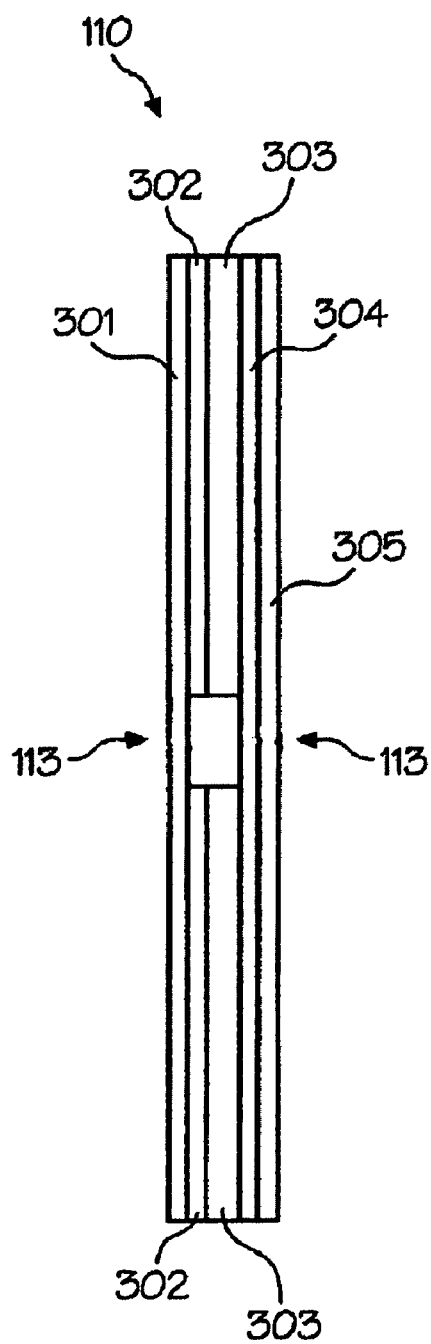
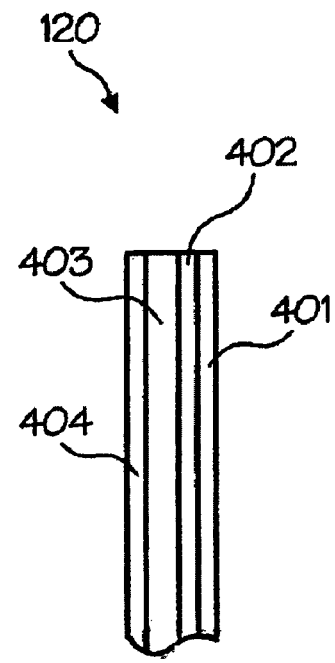
Fig. 3
Fig. 4

CASE FOR PORTABLE ELECTRONIC DEVICE

FIELD OF THE INVENTION

This invention relates generally to cases for portable electronic devices, and relates more particularly to such cases that provide support as well as protection.

BACKGROUND OF THE INVENTION

Advancing technology has made portable electronic devices increasingly popular and has given such devices an ever increasing array of capabilities. Some portable electronic devices, such as cell phones, MP3 players, and the like, are capable of displaying video images. While it is possible to view the video images while holding such video-capable devices in one's hand, it would often be more convenient and more comfortable to set such devices down and have them maintain a position in which the video images can be easily seen. Accordingly, there exists a need for a case for a portable electronic device, especially a video-capable electronic device, that both protects the device and allows it to maintain a hands-free viewing position.

SUMMARY OF PARTICULAR EMBODIMENTS OF THE INVENTION

An invention that in various embodiments satisfies one or more of those needs, provides one or more improvements over the art, and provides still other benefits has now been developed. In various embodiments this invention provides, for example, various cases for portable electronic devices. For instance, in some embodiments, a case may include a first panel having an upper portion and a lower portion separated from each other by a hinge line, a second panel spaced apart from and coupled to the upper portion of the first panel by a first sidewall and a second sidewall, and a third panel spaced apart from and coupled to the lower portion of the first pane; by a third sidewall and a fourth sidewall. In certain embodiments, the first panel is capable of being folded along the hinge line into a flexed position, the first panel, the second panel, the first sidewall, and the second sidewall form a first compartment capable of receiving at least a portion of the portable electronic device, and the first panel, the third panel, the third sidewall, and the fourth sidewall form a second compartment capable of receiving at least a portion of the portable electronic device.

In such an embodiment, a strap may extend from the first panel and the strap may include a first attachment feature such as a snap coupled thereto, and an attachment region containing a second attachment feature such as another snap coupled to the first panel. In this embodiment, the first panel may be capable of being folded along the hinge line into a flexed position, the first attachment feature or snap and the second attachment feature or snap may be capable of being coupled to each other so as to maintain the first panel in the flexed position. In some embodiments, an attachment region also contains a third snap capable of mating with the first snap.

Further, in some embodiments, the hinge line divides the first panel into two portions that are substantially equal to each other in size. In particular embodiments, the second panel comprises a first viewing window, and in some embodiments, the third panel comprises a second viewing window. In various embodiments, the first compartment comprises a lower end that is open and an upper end that is at least partially enclosed. Even so, in some embodiments the second compartment comprises a lower end that is open and an upper end that is open. Further, some embodiments include a clasp coupled to the third panel.

In other or the same embodiments, a case may include a first panel comprising: a first layer, a second layer adjacent to the first layer, and a hinge line, a second panel spaced apart from and coupled to the first panel by a first sidewall and a second sidewall. In this particular embodiment, the second panel may include a third layer and a fourth layer adjacent to the third layer. Such a case may also include a third panel spaced apart from and coupled to the first panel by a third sidewall and a fourth sidewall.

Further, in some embodiments, the first panel is capable of being folded along the hinge line into a flexed position. Still further, in some embodiments, the first panel further comprises a fifth layer adjacent to the second layer, a sixth layer adjacent to the fifth layer, and a seventh layer adjacent to the sixth layer, for example. In some embodiments, the first layer, the fourth layer, and the fifth layer are continuous across the hinge line, and the second layer and the third layer separate at the hinge line. Further, in certain embodiments, the first layer comprises leather, the second layer comprises cardboard, the fifth layer comprises acrylonatrile butadiene styrene, the sixth layer comprises a foam spacer, and the seventh layer comprises suede. Still further, in some embodiments, the second panel further comprises: an eighth layer adjacent to the fourth layer, and a ninth layer adjacent to the eighth layer. In various embodiments, the third layer comprises leather, the fourth layer comprises polyvinyl chloride, the eighth layer comprises acrylonatrile butadiene styrene, the ninth layer comprises suede.

This invention also provides, in the same or yet another embodiment, a case that may include a first panel comprising a first layer, a second layer, a third layer, a fourth layer, a fifth layer, and a hinge line, and a second panel spaced apart from and coupled to the first panel by a first sidewall and a second sidewall. In this embodiment, the second panel may include a sixth layer, a seventh layer, an eighth layer, and a ninth layer. Further, a third panel may be spaced apart from and coupled to the first panel by a third sidewall and a fourth sidewall. In such an embodiment, a strap may extend from the first panel and the strap may include a first attachment feature such as a snap coupled thereto, and an attachment region containing a second attachment feature such as another snap coupled to the first panel. In this embodiment, the first panel may be capable of being folded along the hinge line into a flexed position, the first attachment feature or snap and the second attachment feature or snap may be capable of being coupled to each other so as to maintain the first panel in the flexed position, and the attachment region may be coupled to the first panel via stitching that extends through the attachment region, the first layer, and the second layer.

In some embodiments, the hinge line divides the first panel into an upper portion and a lower portion, and the upper portion and the lower portion are substantially equal to each other in size. In various embodiments, the first layer, the fourth layer, and the fifth layer are continuous across the hinge line, and the second layer and the third layer separate at the hinge line. Various embodiments contain different combinations of these elements.

Various objects, advantages, and benefits exist for many of the different embodiments of the invention described herein. Such objects, advantages, and benefits may include at least partially satisfying one or more of the various needs or room for improvement over the art described herein. Other objects, advantages, and benefits will be apparent to a person of ordinary skill in the art. Not all of the embodiments necessarily address all or any of the needs or objects or provide the advantages or benefits specifically described herein.

BRIEF DESCRIPTION OF THE DRAWINGS

The invention will be better understood from a reading of the following detailed description of examples of embodiments, taken in conjunction with the accompanying figures in the drawings in which:

FIG. 3 is a cross sectional view of a back panel of the case of FIG. 1 according to an embodiment of the invention;

FIG. 4 is a cross sectional view of a part of a front panel of the case of FIG. 1 according to an embodiment of the invention;

Figure 1:
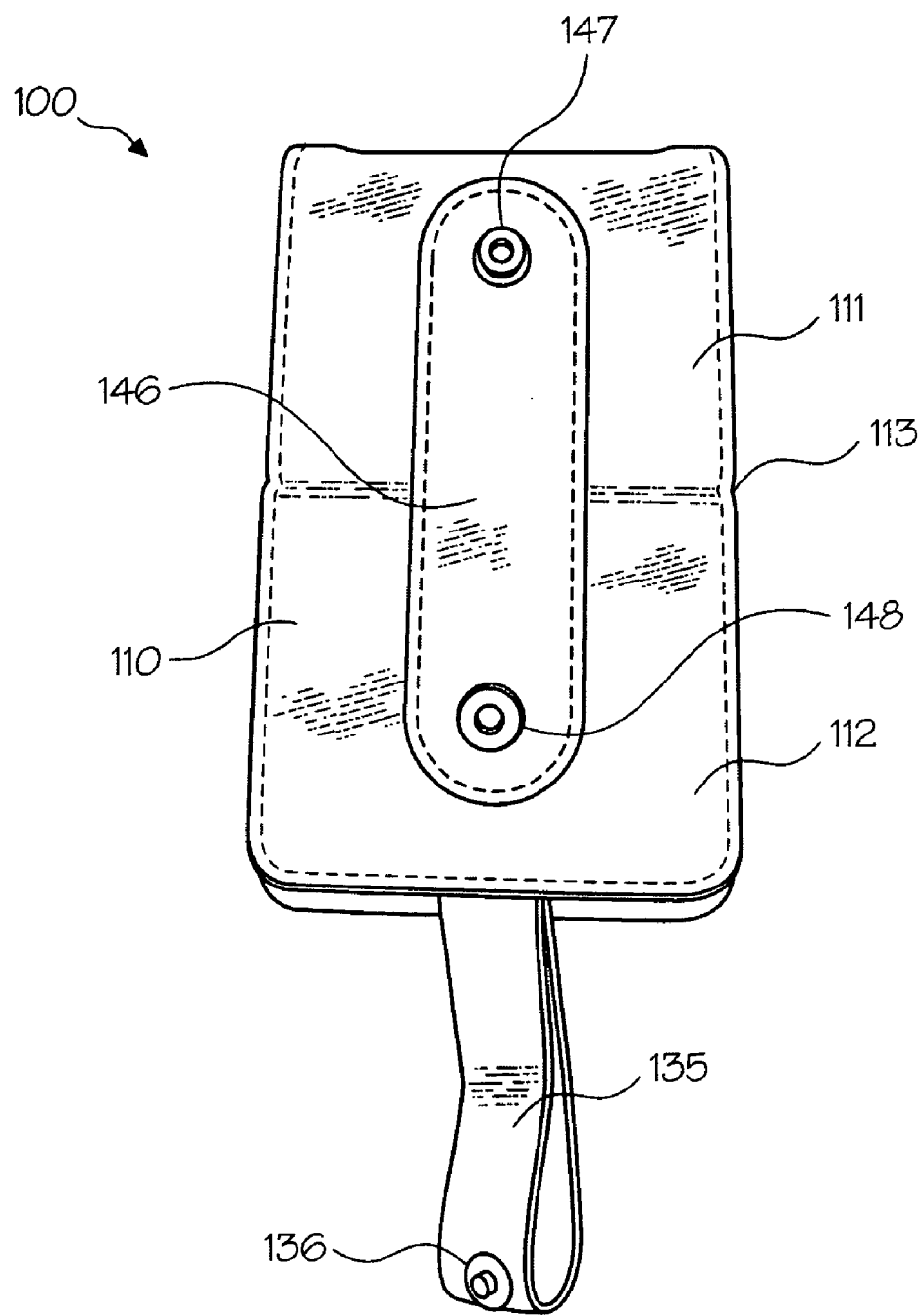
FIG. 1 is an elevational view of a case for a portable electronic device according to an embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner. The phrase "adjacent to," as used herein, encompasses the meanings of "next to," "close to," "lying near," "adjoining," and the like, whether or not the elements described as being adjacent to each other are in physical contact with each other.

DETAILED DESCRIPTION OF EXAMPLES OF EMBODIMENTS

This invention provides, among other things, cases for portable electronic devices, including such cases that provide support as well as protection. In certain embodiments, cases may be configured to contain a video-capable electronic device, for example. Particular embodiments of cases both protect the device and allows it to maintain a hands-free viewing position.

Figure 2:
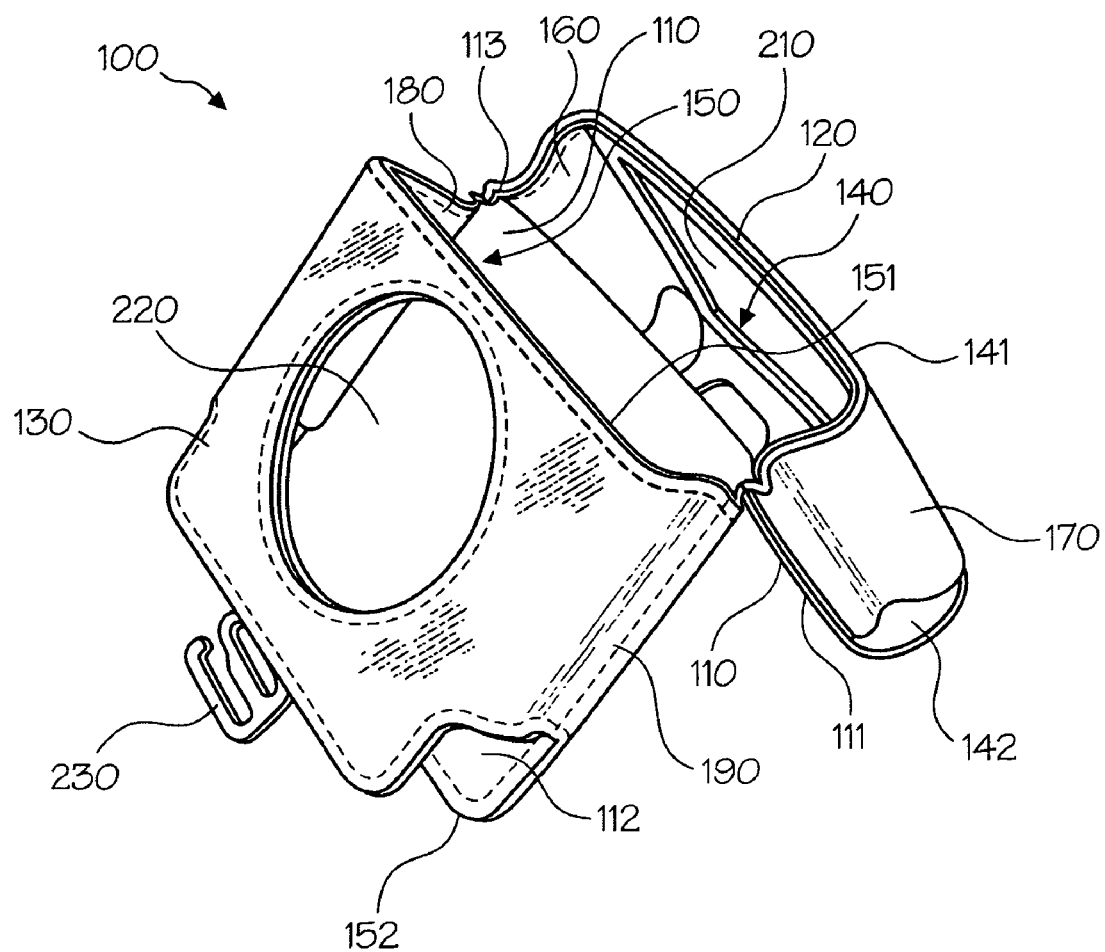
FIG. 2 is an isometric view of the case of FIG. 1 according to an embodiment of the invention, shown in an open or flexed position.

Referring now to the figures, FIG. 1 is an elevational view of a case 100 for a portable electronic device according to an example of an embodiment of the invention, and FIG. 2 is an isometric view of case 100 in a different orientation and configuration. As illustrated in FIG. 1, in this particular embodiment, case 100 comprises a panel 110 having a portion 111 and a portion 112 separated from each other by a hinge line 113. As shown in FIG. 2, a panel 120 is spaced apart from and coupled to portion 111 of panel 110 by a sidewall 160 and a sidewall 170, and a panel 130 is spaced apart from and coupled to portion 112 of panel 110 by a sidewall 180 and a sidewall 190.

As illustrated in FIG. 2, panel 110, in this particular embodiment, is capable of being folded along hinge line 113 into a flexed position. FIG. 2 further illustrates that, in some embodiments, panel 110, panel 120, sidewall 160, and sidewall 170 form a compartment 140 capable of receiving at least a portion of the portable electronic device, and that panel 110, panel 130, sidewall 180, and sidewall 190 form a compartment 150 capable of receiving at least a portion of the portable electronic device. In the embodiment illustrated in FIG. 2, compartment 140 comprises an end 141 that is open and an end 142 that is at least partially enclosed. Also in the illustrated embodiment, compartment 150 comprises an end 151 and an opposing end 152, both of which are open in this embodiment.

In this embodiment, hinge line 113 divides panel 110 into two portions, i.e., portions 111 and 112, that are substantially equal to each other in size. Further, in this embodiment, and as illustrated in FIG. 2, panel 120 comprises a viewing window 210 and panel 130 comprises a viewing window 220.

As shown in FIG. 1, in certain embodiments, case 100 further comprises a strap 135 extending from portion 112 of panel 110, which may have an attachment feature 136 coupled thereto. This particular embodiment still further comprises an attachment feature or region 146 coupled to panel 110, and yet further comprises a clasp 230 coupled to panel 130. Attachment feature 136, which may be a snap, for example, and may also be referred to herein as snap 136. Attachment feature 136 and attachment feature or region 146 may be capable of being coupled to each other so as to maintain panel 110 in a flexed position as illustrated in FIG. 2, for instance. In the illustrated embodiment, attachment feature or region 146 comprises a snap 147 capable of mating with snap 136. Also in the illustrated embodiment, attachment feature or region 146 contains a snap 148 that is also capable of mating with snap 136. Other embodiments may use hook and loop fasteners (e.g., VELCRO) or buckles (e.g., plastic buckles) instead of or in addition to one or more of the snaps, clasps, or carabiners in the embodiment illustrated.

In some embodiments, attachment feature or region 146 is made of a soft PVC material, which has the advantages of being inexpensive and of being capable of protecting the surface on which case 100 is placed. In other embodiments, soft rubber, silicon, or the like may be used in place of the soft PVC material.

FIG. 3 is a cross sectional view of a part of panel 110 according to certain embodiments of the invention. And FIG. 4 is a cross sectional view of a part of panel 120 according to particular embodiments of the invention. It should be understood that the thicknesses of the layers depicted in FIGS. 3 and 4 are not meant necessarily to represent actual thicknesses, nor are the relative thicknesses necessarily representative of the actual relative thicknesses of layers 301, 302, 303, 304, and 305 of panel 110 and layers 401, 402, 403, and 404 of panel 120, respectively.

As illustrated in FIG. 3, in this particular embodiment, shown as an example of the invention, panel 110 comprises a layer 301, a layer 302 adjacent to layer 301, a layer 303 adjacent to layer 302, a layer 304 adjacent to layer 303, and a layer 305 adjacent to layer 304. Layer 301 may be the layer that is visible in FIG. 1, for instance, and that forms the outside back layer of case 100. Layer 305 may be visible in FIG. 2 as the inside layer of panel 110, for example.

In some embodiments, layers 301, 302, 303, 304, and 305 comprise, respectively, a covering made of leather (for example, split leather), PVC, polyurethane, fabric, or the like, a body layer made of acrylonatrile butadiene styrene (ABS) or the like, a stiffener layer made of cardboard or the like, a spacer layer made of foam or the like, and a covering and cushioning layer made of suede or the like. It should be understood that layers 301-305 can also have other uses and perform functions other than the ones mentioned above, and that different combinations or arrangements may be found in different embodiments. Attachment feature or region 146 may be stitched to layers 301 and 302. In the embodiments illustrated, the dashed lines in the figures represent stitching, and the locations of the dashed lines in the figures illustrate one embodiment of where such stitching may be located. In some embodiments, some or all of the different layers may be attached with an adhesive, for example, instead of or in addition to stitching. In some embodiments, the cardboard or other material of layer 303 lends rigidity to case 100, and also acts as a place to attach layer 302. ABS is a suitable material for layer 302 in many embodiments because it, like layer 303, lends stiffness to case 100 while maintaining its shape better at lesser thicknesses than, for example, polyethylene, although polyethylene may be used in its place in some embodiments, if desired.

In the illustrated embodiment, layers 301, 304, and 305 are continuous across hinge line 113, while layers 302 and 303 separate at hinge line 113. Providing a separation or break in layers 302 and 303 at hinge line 113 allows case 100 to be more easily flexed at hinge line 113 in some embodiments. In other embodiments, any one or more of layers 301, 304, and 305 may be separated at hinge line 113 or elsewhere instead of or in addition to layers 302 and 303. In the same or another embodiment, attachment feature or region 146 may be coupled to panel 110 via stitching that extends through attachment feature or region 146, layer 301, and layer 302, for example.

As illustrated in FIG. 4, in this particular embodiment, panel 120 comprises a layer 401, a layer 402 adjacent to layer 401, a layer 403 adjacent to layer 402, and a layer 404 adjacent to layer 403. Layer 401 may be the layer that is visible in FIG. 2 and that forms the outside front layer of case 100, for example. In one embodiment, for example, layers 401, 402, 403, and 404 comprise, respectively, a covering made of leather or the like, a body layer made of acrylonatrile butadiene styrene (ABS) or the like, a transparent layer made of clear or translucent polyvinyl chloride (PVC) or the like, and a covering and cushioning layer made of suede or the like. It should be understood that layers 401-404 can also have other uses and perform functions other than the ones mentioned above, and that other combinations and arrangements may be found in different embodiments.

Figure 5:
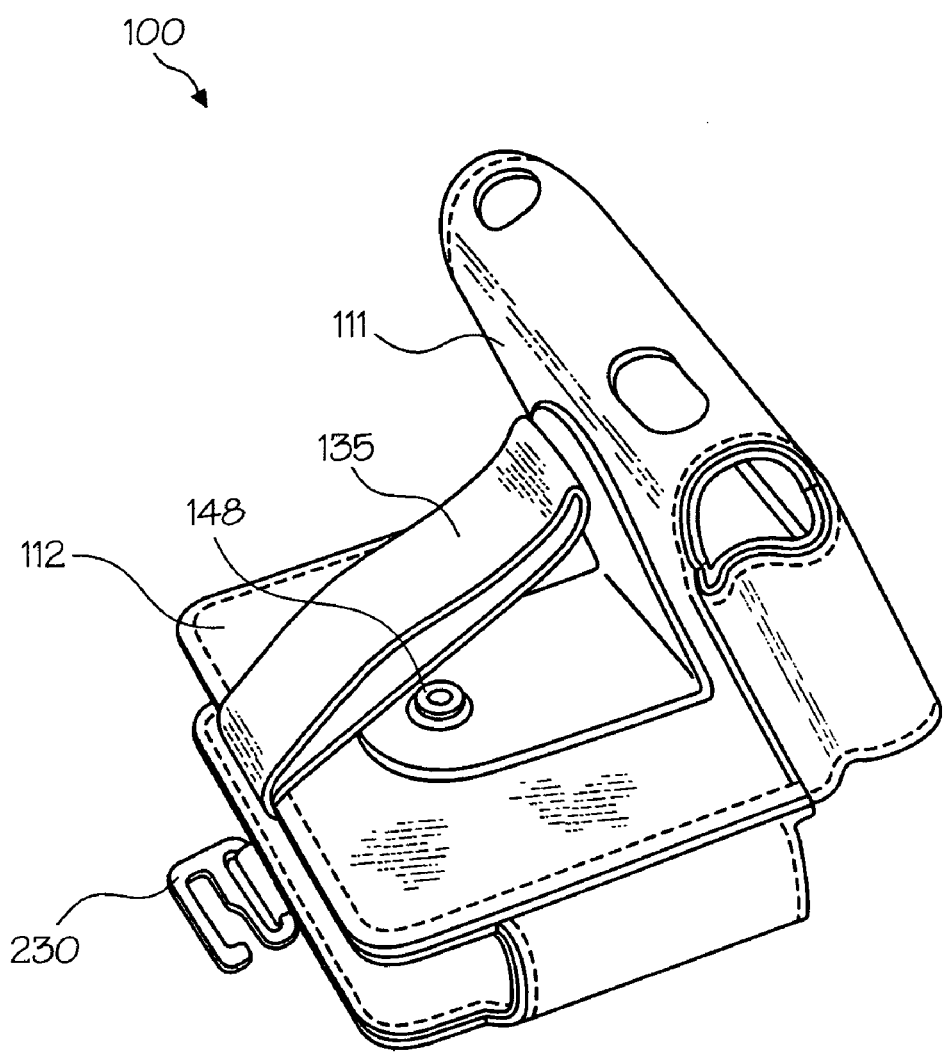
FIG. 5, which is an isometric view of the case of FIG. 1 in a flexed position according to an embodiment of the invention.

It was mentioned above that snap 136 and snap 147 are capable of interacting by connecting to each other in the embodiment illustrated. Such interaction allows case 100 to be maintained in a flexed position in many embodiments. The maintenance of case 100 in a flexed position via the interaction of snaps 136 and 147 is illustrated in FIG. 5, which is an isometric view of case 100 according to an embodiment of the invention provided as an example.

Figure 6:
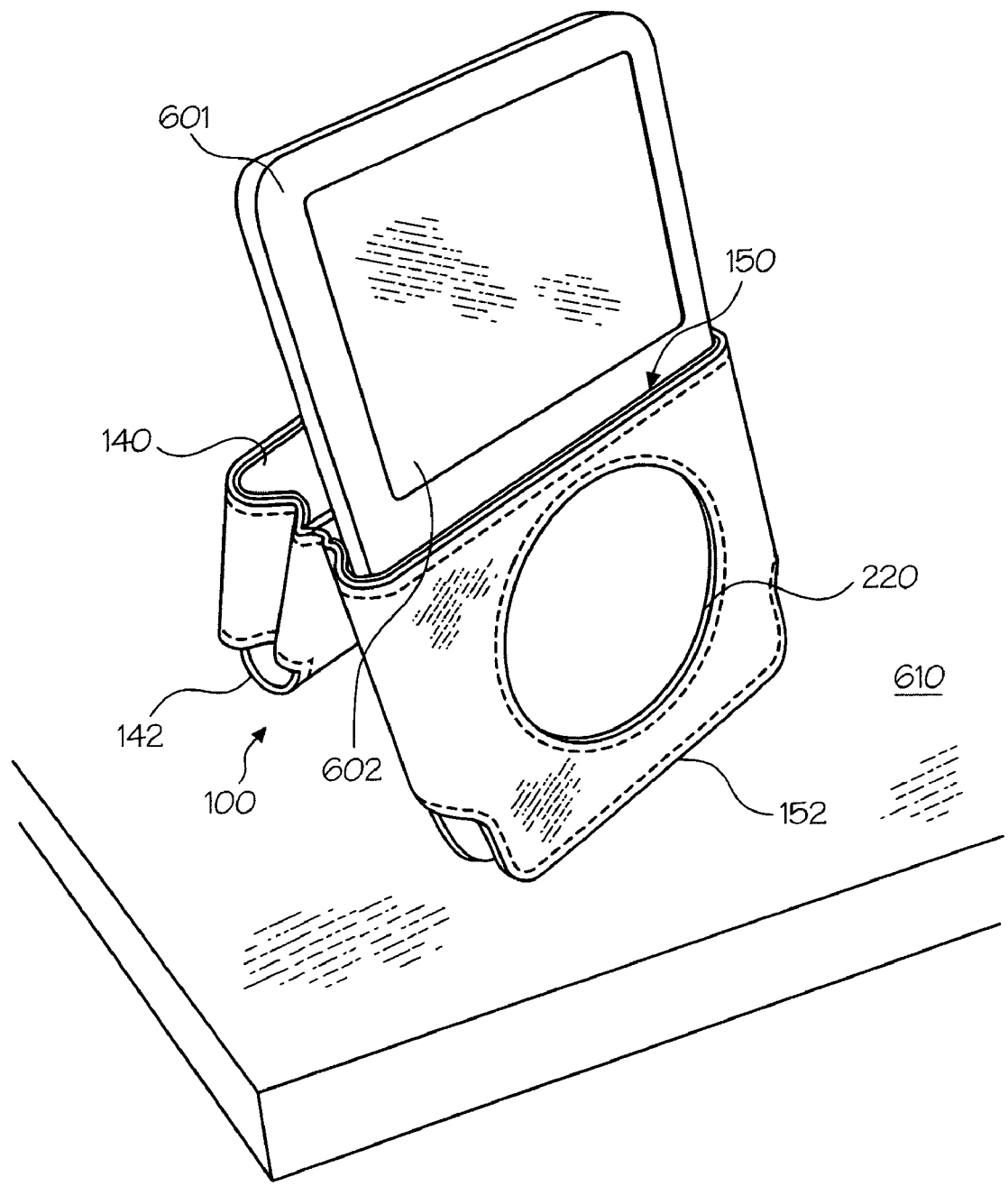
FIG. 6 is an isometric view of the case of FIG. 1 in a flexed position holding a portable electronic device according to an embodiment of the invention.

FIG. 6 is an isometric view of case 100 according to the same embodiment of the invention. FIG. 6 illustrates a portable electronic device 601 in case 100. As shown, portable electronic device 601 rests within compartment 150 (shown, for example, in FIG. 2) while end 152 rests on a surface 610. End 142 also rests on surface 610, which can be any surface, flat or otherwise, on which it is desired that case 100 and portable electronic device 601 be situated. Surface 610 may be a substantially horizontal surface of a desk or table, for example. As may be seen in FIG. 6, case 100 is in a flexed position, which places portable electronic device 601 at a viewing angle that affords a good view of a screen 602 of portable electronic device 601. Thus, in this embodiment, pictures, movies, or other images may be viewed on screen 602 without the need to hold portable electronic device 601 in the hand. Instead, in various embodiments, case 100 is a freestanding case capable of multiple viewing angles.

In this particular embodiment, if desired, the viewing angle shown in FIG. 6 may be changed by first threading strap 135 through clasp 230 and then attaching snap 136 to attachment feature or region 146. Doing so pulls compartment 150 closer to compartment 140 such that case 100 is flexed even farther than what is shown in FIG. 6, for instance. Case 100 may also be placed in a flexed position without engaging any of the snaps, in some embodiments.

Figure 7:
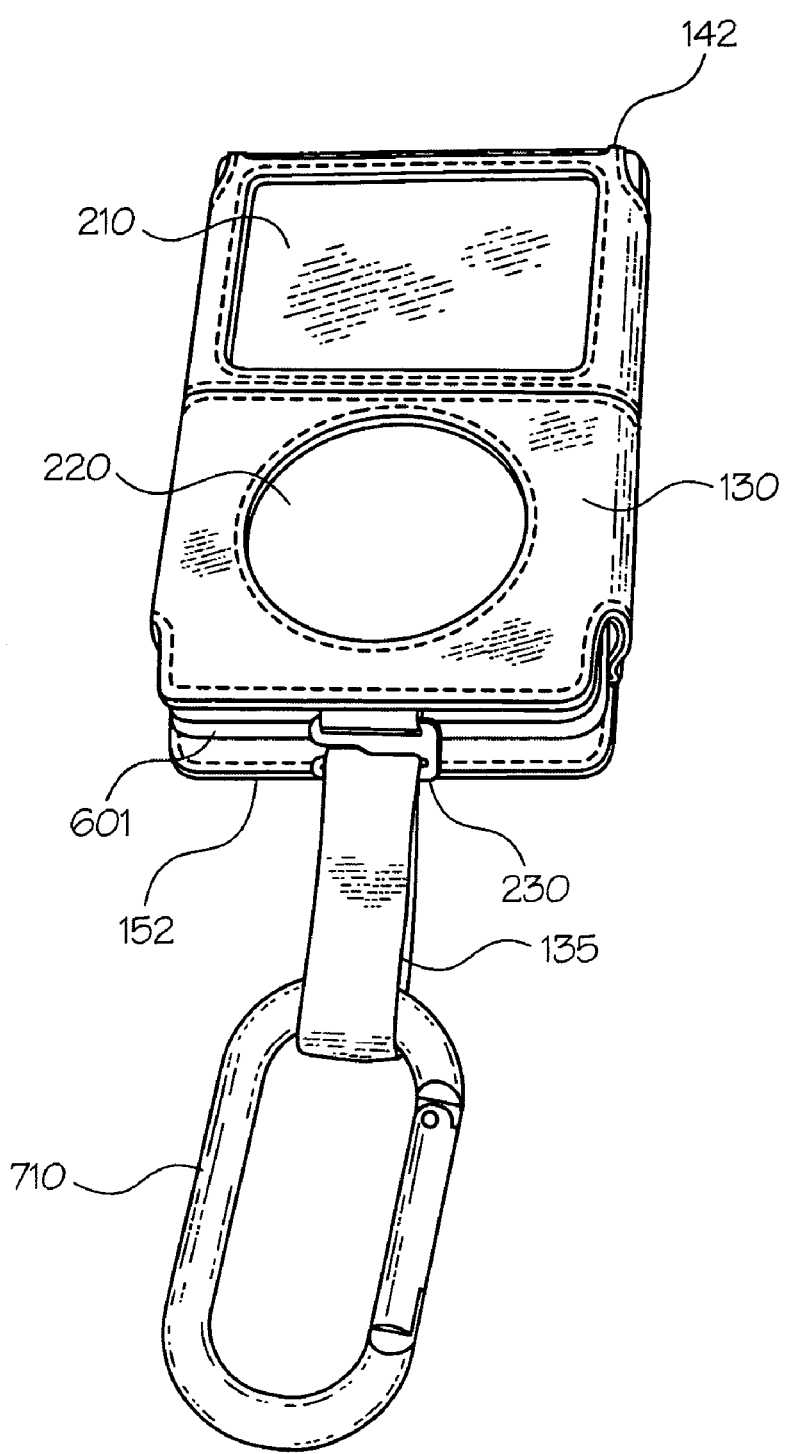
FIG. 7 is a perspective view of a portable electronic device inside the case of FIG. 1 according to an embodiment of the invention.

FIG. 7 is an isometric view of portable electronic device 601 inside case 100 according to the same embodiment of the invention. FIG. 7 depicts case 100 in a non-flexed position, with portable electronic device 601 within both compartment 150 (see FIG. 2) and compartment 140 (also see FIG. 2). With portable electronic device 601 almost fully contained within case 100 in this fashion, portable electronic device 601 is in a position to be protected from damage in the embodiment and position shown.

In this embodiment, in order to place portable electronic device 601 in case 100 as is shown in FIG. 7, portable electronic device 601 may first be inserted into compartment 150 through end 152 and then into compartment 140, for example. In certain embodiments, strap 135 may be disengaged from clasp 230 during this insertion process. After portable electronic device 601 is inserted into case 100 as shown, in some embodiments, strap 135 may be threaded through clasp 230 as illustrated, thereby securing portable electronic device 601 in place within case 100. In this particular embodiment, threading strap 135 through clasp 230 in this manner partially closes or seals end 152 and prevents the passage of portable electronic device 601 through end 152.

A clip, snap link, or carabiner 710 may be attached to case 100, for example by clipping carabiner 710 through strap 135 as shown in FIG. 7. Carabiner 710 may be an oval spring-gate rock climbing carabiner, for example, or a smaller carabiner or snap link having a similar configuration but possibly less strength. If desired, carabiner 710 may then be attached to another item such as a belt loop, the strap on a backpack, purse, or other bag, or the like. Note that in this embodiment, viewing window 220 allows visible and tactile access to a portion of portable electronic device 601. In the illustrated embodiment, where portable electronic device 601 is an iPod, that portion is the click wheel of the iPod, for example. In the same embodiment, viewing window 210 allows at least visible access to a different portion of portable electronic device 601, such as, for example, the view screen of the iPod.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the case discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A case for a portable electronic device, the portable electronic device comprising a first portion and a second portion, the case comprising:
   a first panel having an upper portion and a lower portion separated from each other by a hinge line;
   a second panel spaced apart from and coupled to the upper portion of the first panel by a first sidewall and a second sidewall;
   a third panel spaced apart from and coupled to the lower portion of the first panel by a third sidewall and a fourth sidewall;
   a strap extending from the first panel;
   a first coupling mechanism coupled to the strap;
   a second coupling mechanism configured to couple to the strap; and
   a third coupling mechanism configured to couple to the first coupling mechanism, wherein:
      the first panel is capable of being folded along the hinge line into a flexed position;
      the first panel, the second panel, the first sidewall, and the second sidewall form a first compartment capable of receiving at least the first portion of the portable electronic device;
      the first panel, the third panel, the third sidewall, and the fourth sidewall form a second compartment capable of receiving at least the second portion of the portable electronic device while the first compartment is receiving the at least the first portion of the port able electronic device;
      the second compartment is further capable of receiving the at least the second portion of the portable electronic device while the first compartment is devoid of the at least the first portion of the portable electronic device;
      the first compartment is capable of receiving the at least the first portion of the portable electronic device while the second compartment is devoid of the at least the second portion of the portable electronic device;
      the strap, the first coupling mechanism, the second coupling mechanism, and the third coupling mechanism are configured such that when the strap is coupled to the second coupling mechanism and the first coupling mechanism is coupled to the third coupling mechanism, the first compartment is at a first angle with the second compartment;
      the strap, the first coupling mechanism, and the third coupling mechanism are configured such that when the strap is devoid of a coupling with the second coupling mechanism and the first coupling mechanism is coupled to the third coupling mechanism, the first compartment is at a second angle with the second compartment; and
      the first angle is different than the second angle.

2. The case of claim 1 wherein:
the strap extends from the lower portion of the first panel;
the third coupling mechanism is coupled to the first panel; and:
the first coupling mechanism and the third coupling mechanism are capable of being coupled to each other so as to maintain the first panel in the flexed position.

3. The case of claim 2 wherein:
the first coupling mechanism comprises a first snap; and
the third coupling mechanism comprises an attachment region comprising at least a second snap capable of mating with the first snap.

4. The case of claim 3 wherein:
the attachment region also contains a third snap capable of mating with the first snap.

5. The case of claim 1 wherein:
the hinge line divides the first panel into two portions that are substantially equal to each other in size.

6. The case of claim 1 wherein:
the second panel comprises a first viewing window.

7. The case of claim 6 wherein:
the third panel comprises a second viewing window.

8. The case of claim 1 wherein:
the first compartment comprises a lower end that is open and an upper end that is at least partially enclosed.

9. The case of claim 8 wherein:
the second compartment comprises a lower end that is open and an upper end that is open.

10. The case of claim 1 further comprising:
a clasp coupled to the third panel.

11. A case for a portable electronic device, the portable electronic device comprising a first portion and a second portion, the case comprising:
    a first panel comprising a first layer, a second layer coupled to the first layer, a third layer coupled to the second layer, a fourth layer coupled to the third layer, and a fifth layer coupled to the fourth layer;

a second panel spaced apart from and coupled to the first panel by a first sidewall and a second sidewall, the second panel comprising a sixth layer, a seventh layer, an eighth layer, and a ninth layer;

a third panel spaced apart from and coupled to the first panel by a third sidewall and a fourth sidewall;

a strap extending from the first panel and having a first snap coupled thereto;

a second snap coupled to the first panel;

a third snap coupled to the first panel; and a clasp configured to be coupled to the strap, wherein:

a hinge line extends through at least the first layer;

the first panel is capable of being folded along the hinge line into a flexed position;

the first snap and the second snap are capable of being coupled to each other so as to maintain the first panel in the flexed position;

the clasp is coupled to the third panel such that the clasp can be coupled to the strap to secure the first portion of the portable electronic device between the first panel, the third panel, the third sidewall, and the fourth sidewall when the first snap and second snap are coupled to each other; and the clasp is coupled to the third panel such that the clasp can be coupled to the strap to secure the first portion of the portable electronic device between the first panel, the third panel, the third sidewall, and the fourth sidewall when the first snap and third snap are coupled to each other.

12. The case of claim 11 wherein:

the hinge line divides the first panel into an upper portion and a lower portion; and the upper portion and the lower portion are substantially equal to each other in size.

13. The case of claim 12 wherein:

the first layer, the fourth layer, and the fifth layer are continuous across the hinge line; and the second layer and the third layer separate at the hinge line.

14. The case of claim 1 wherein:

the first compartment is capable of receiving the at least the first portion of the portable electronic device while the second compartment is receiving the at least the second portion of the portable electronic device.

15. The case of claim 11 wherein:

the hinge line divides the first panel into a first portion and a second portion;

the second panel is coupled to the first portion of the first panel; and the third panel is coupled to the second portion of the first panel.

16. The case of claim 11 wherein:

the hinge line divides the first panel into a first portion and a second portion;

the second snap is located at the first portion of the first panel; and the third snap is located at the second portion of the first panel.

17. The case of claim 16 wherein:

the first panel has an exterior side and an interior side opposite the exterior side;

the second panel is spaced apart from the interior side of the first panel;

the third panel is spaced apart from the interior side of the first panel;

the hinge line divides the exterior side of the first panel into a first portion and a second portion;

the first panel is configured such that a first angle between the first portion of the exterior side of the first panel and the second portion of the exterior side of the first panel is approximately one hundred and eighty degrees when the first panel is in a non-flexed position;

the strap, the first snap, the second snap, and the clasp are configured such that when the strap is coupled to the clasp and the first snap is coupled to the second snap, the first portion of the exterior side of the first panel is at a second angle with the second portion of the exterior side of the first panel;

the strap, the first snap, and the second snap are configured such that when the strap is devoid of a coupling with the clasp and the first snap is coupled to the second snap, the first portion of the exterior side of the first panel is at a third angle with the second portion of the exterior side of the first panel;

the second angle and third angle are less than one hundred and eighty degrees; and the second angle is different than the third angle.

18. The case of claim 1, wherein:

the first and second angles are measured about the hinge line; and the first and second angles are substantially different than 180 degrees.

19. The case of claim 1, wherein:

the second and third panels are substantially collinear with and adjacent to each other when the first panel is not folded at a non-flexed position.

20. The case of claim 1, wherein:

when the first panel is in the flexed position, the second portion of the portable device is received at the second compartment, and the first compartment is devoid of the at least the first portion of the portable electronic device:

the portable electronic device is maintained in a hands-free viewing position when opposite ends of the first and second compartments rest over a substantially flat surface.

21. The case of claim 1, wherein:

the third coupling mechanism comprises:

a first coupler configured to couple with the first coupling mechanism when the first compartment is at the first angle with the second compartment; and a second coupler configured to couple with the first coupling mechanism to maintain the first compartment at the second angle with the second compartment.

22. The case of claim 1, wherein:

the third coupling mechanism comprises:

a first coupler configured to couple with the first coupling mechanism when the first panel is in an unflexed position; and a second coupler configured to couple with the first coupling mechanism to maintain the first panel in the flexed position.

23. The case of claim 1, wherein:

when the strap and the second coupling mechanism are coupled together, the strap and the second coupling mechanism straddle an opening at an end of the second compartment.

24. The case of claim 23, wherein:

the portable electronic device is restricted from passage through the opening at the end of the second compartment when the strap and the second coupling mechanism are coupled together.

25. The case of claim 1, wherein:
the second panel is collinear with the third panel when the first compartment is at the first angle with the second compartment; and
the second panel is non-collinear with the third panel when the first compartment is at the second angle with the second compartment.

26. The case of claim 1, wherein:
the first and second angles are measured about the hinge line;
the first angle comprises approximately 180 degrees; and
the second angle is substantially different than 180 degrees.

27. The case of claim 1, wherein:
at least one of the second or third panels comprises a transparent layer for access to a portion of the portable electronic device.

* * * * *